UNITED STATES PATENT OFFICE.

ARTHUR SUTTON, OF CHICAGO, ILLINOIS, ASSIGNOR TO CHICAGO WOOD FINISHING CO., OF CHICAGO, ILLINOIS, A CORPORATION OF ILLINOIS.

GRAINING MATERIAL.

No. 888,859.     Specification of Letters Patent.     Patented May 26, 1908.

Application filed March 26, 1908. Serial No. 423,342.

*To all whom it may concern:*

Be it known that I, ARTHUR SUTTON, a citizen of the United States, residing at Chicago, in the county of Cook and State of Illinois, have invented new and useful Improvements in Graining Material, of which the following is a specification.

The object of this invention is to provide a graining material which may be applied over a ground coat to produce an imitation on any kind of surface of Flemish, mission, weathered or any other kind or shade of finish without the use or application in any way of a glaze or final vehicle unless desired.

Another object of the invention is to provide a graining material which does not contain alcohol, beer or vinegar and which is colored with basic anilin colors instead of earth or chrome coloring matter. And a further object of the invention is to provide a graining material which is adapted to be packed and sold to the trade in packages ready for use, which will keep indefinitely in the packages without deterioration, which can be readily applied with any graining tool to produce an imitation of any kind of finish, and which does not require subsequent treatment to produce the desired effect.

With these and other ends in view the graining material comprises a vehicle for carrying an anilin color, which vehicle is made by grinding aluminous clay, commonly known as white china clay, in a mixture consisting of orange shellac, powdered borax and dextrin or potato starch mixed in water. Anilin is added to produce the desired color or shade and then a small amount of formaldehyde or other suitable preservative is added to prevent fermentation or deterioration.

In preparing the graining material I make the mixture in or about the following proportions:—one pound of orange shellac, four ounces of powdered borax, or other suitable alkaline substance, four ounces of dextrin or potato starch and one gallon of water. The mixture is heated to the boiling point and then allowed to cool after which the white china clay is added in a proportion of about two pounds of white china clay to one gallon of the mixture. Instead of proceeding in this manner I may add the china clay to the mixture before boiling and then boil all together.

The material is tinted or colored by the addition of basic anilin colors dissolved in warm water, employing any shade or various shades of anilin to obtain the desired shade for the graining material. After the proper shade is obtained about two ounces of the formaldehyde or other preservative is added. This material may be used with any graining tool and is applied over a ground coat to produce an imitation on any kind of surface of any kind or shade of finish. It does not require the use or application of any kind of glaze or final vehicle to produce the desired result but a coat of shellac or varnish may be applied if desired. The material will not dry as quickly as similar materials containing alcohol but it will dry more rapidly than similar materials containing beer or vinegar and it is not liable to ferment like the last mentioned materials.

What I claim and desire to secure by Letters Patent is:

1. A graining material vehicle containing shellac, an alkaline substance, dextrin, china clay and a liquid.

2. A graining material containing shellac, an alkaline substance, dextrin, china clay, a liquid and an anilin color.

3. A graining material containing shellac, borax, dextrin, china clay, water and a basic anilin color.

4. A graining material vehicle containing shellac, an alkaline substance, dextrin, china clay, a liquid, and a preservative.

5. A graining material vehicle containing shellac, an alkaline substance, dextrin, china clay, a liquid, and formaldehyde.

6. A graining material containing shellac, borax, dextrin, china clay, water, an anilin color and formaldehyde.

7. The process of making a graining material vehicle which consists in preparing a mixture of shellac, borax, dextrin and water, boiling and then cooling said mixture and adding china clay, in or about the proportions specified.

8. The process of making a graining material which consists in preparing a mixture of shellac, borax, dextrin and water, boiling and then cooling said mixture, adding china clay, and then adding an anilin color and formaldehyde in or about the proportions specified.

ARTHUR SUTTON.

Witnesses:
 HENRY EIMSTAD,
 GEORGE MELFORD.